United States Patent [19]

Nauta et al.

[11] Patent Number: 5,065,093

[45] Date of Patent: Nov. 12, 1991

[54] INDUCTIVE PROXIMITY SENSOR FOR DETECTING AN OBJECT STARTING ELECTRICAL CONDUCTIVITY

[75] Inventors: Hendrikus C. Nauta, Nootdorp; Ernst H. Nordholt, Berkel en Rodenrijs, both of Netherlands

[73] Assignee: Catena Product Development B.V., Delft, Netherlands

[21] Appl. No.: 235,103

[22] Filed: Aug. 23, 1988

[30] Foreign Application Priority Data

Aug. 24, 1987 [NL] Netherlands ............... 8701980

[51] Int. Cl.$^5$ .................. G01B 7/00; G01B 7/14; G01R 33/025
[52] U.S. Cl. .................. 324/207.12; 324/207.19; 324/207.26; 324/236
[58] Field of Search ............... 324/207, 208, 224–228, 324/232–234, 236–243, 260, 262, 207.12, 207.16, 207.18, 207.19, 202.26; 336/84 C, 84 M; 331/65

[56] References Cited

U.S. PATENT DOCUMENTS

| | | | |
|---|---|---|---|
| 3,510,858 | 5/1970 | Flanagan | 324/207 X |
| 3,659,194 | 4/1972 | Blackerby | 324/234 |
| 3,707,671 | 12/1972 | Morrow et al. | 324/224 |
| 4,095,181 | 6/1978 | Harris et al. | 324/238 |
| 4,419,646 | 12/1983 | Hermle | 324/207 X |
| 4,593,244 | 6/1986 | Summers et al. | 324/234 X |

FOREIGN PATENT DOCUMENTS

| | | |
|---|---|---|
| 322852 | 4/1984 | Fed. Rep. of Germany . |
| 2346679 | 4/1976 | France . |
| 2545221 | 4/1983 | France . |
| 62-87349 | 4/1987 | Japan ................. 324/236 |
| 681365 | 8/1979 | U.S.S.R. ............... 324/238 |

Primary Examiner—Kenneth Wieder
Assistant Examiner—W. S. Edmonds

[57] ABSTRACT

Inductive proximity sensor for detecting an object having electrical conductivity comprising a sensor housing, a measuring coil and reference coil placed on either side of a plane of symmetry through the sensor housing. Each coil is partly surrounded by a piece of magnetic material which leaves the measuring coil or reference coil respectively free at the front which faces the direction of the object to be detected or a reference member. An electronic circuit is provided for supplying both coils with an AC signal and for measuring the change in a specific property of the measuring coil with respect to that of the reference coil when object approaches and determining therefrom the distance or the presence of the object. The pieces of magnetic material around the two coils are formed essentially from the same homogeneous material forming a block. Means are provided in the sensor housing for screening magnetic fields produced by both coils in order to suppress thereby mutual crosstalk. The electronic circuit for each coil has a separate synchronous detector with its own oscillator for effecting a frequency-selective measurement such that the effect of changes in the properties of the magnetic material and of the measuring coil on the detection distance is compensated for electronically. Both oscillators of the synchronous detectors have a frequency offset from each other.

7 Claims, 6 Drawing Sheets

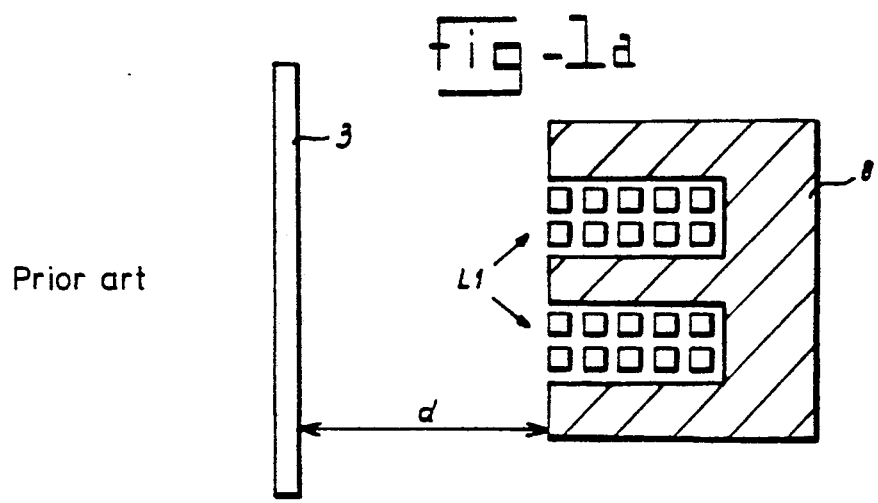
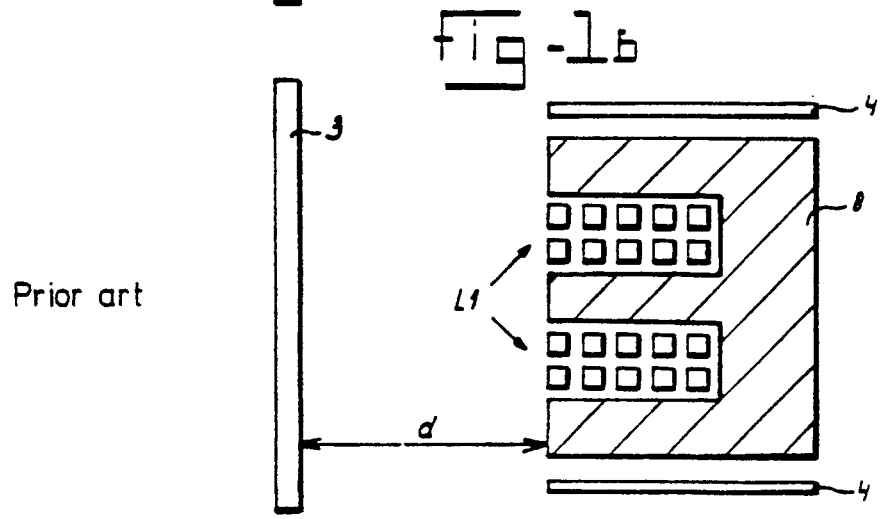
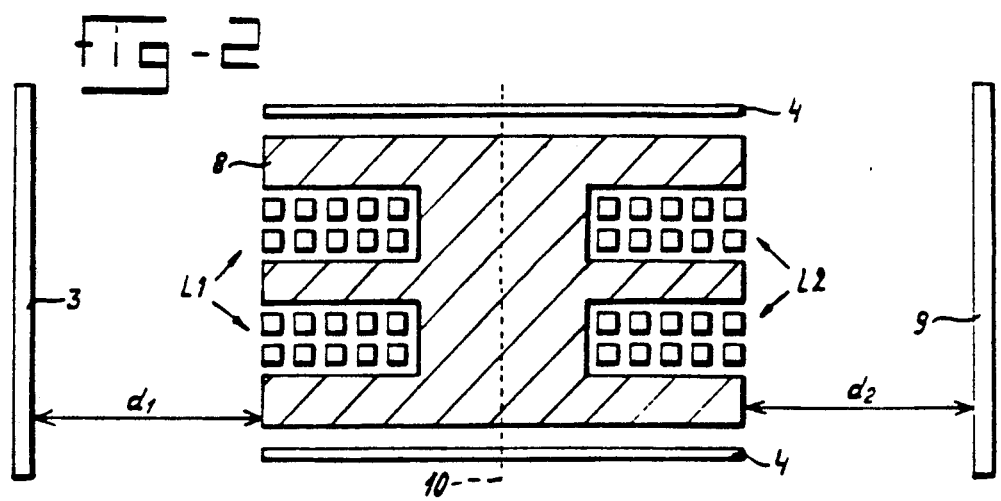

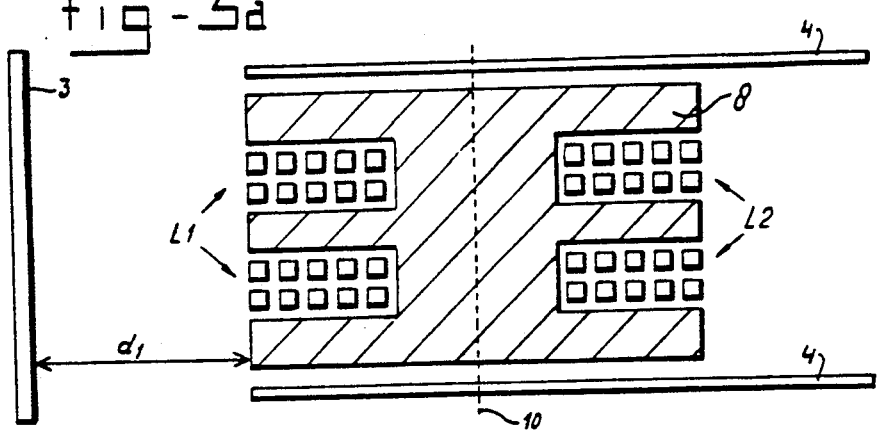
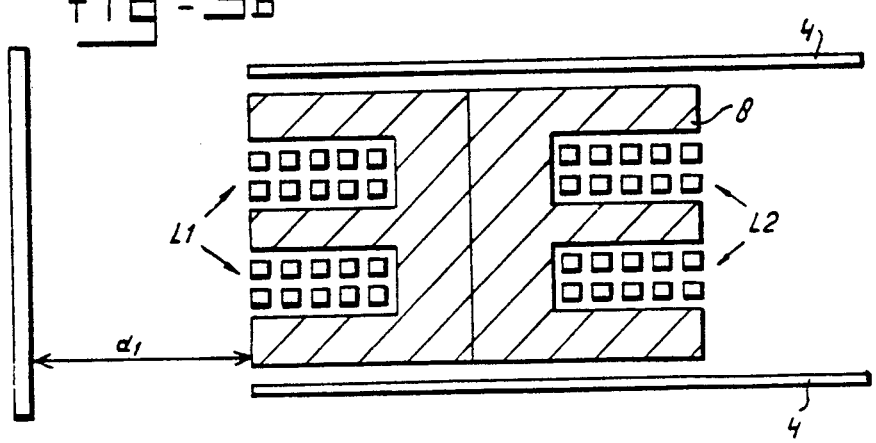
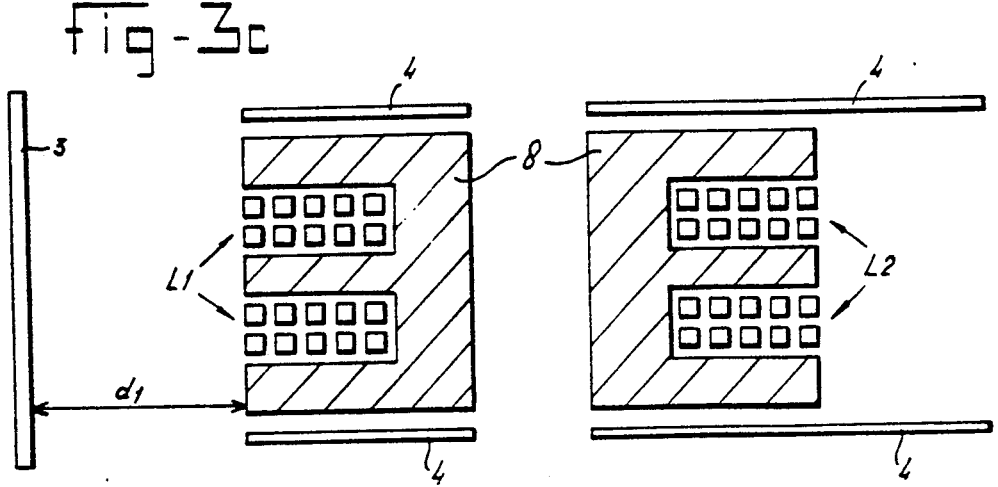

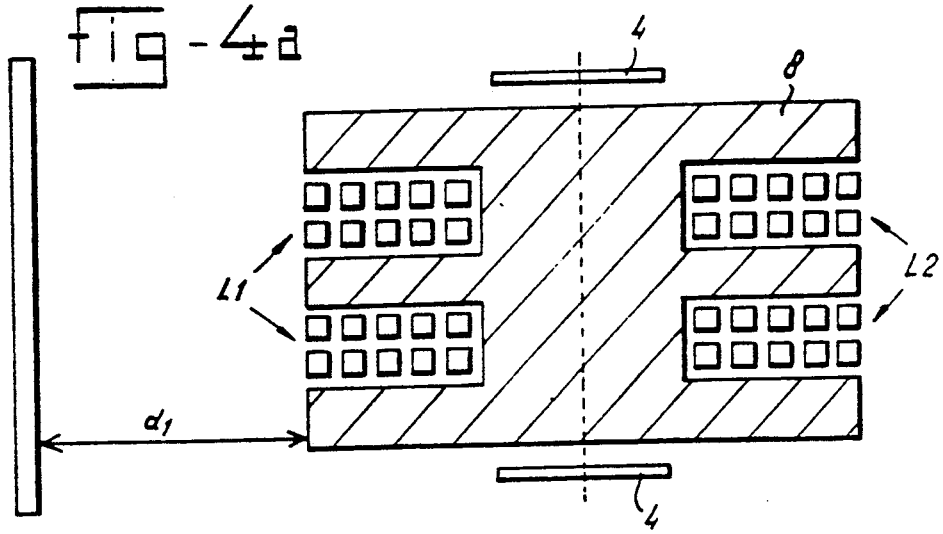
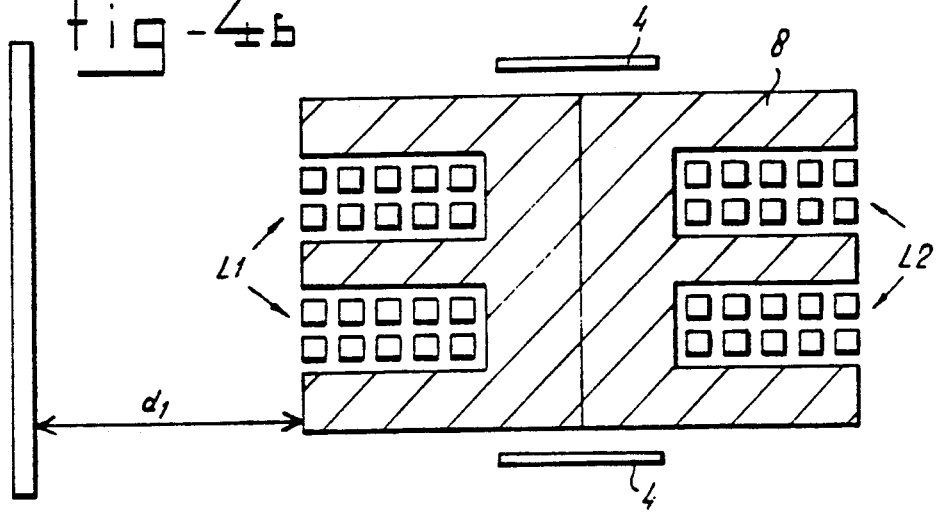
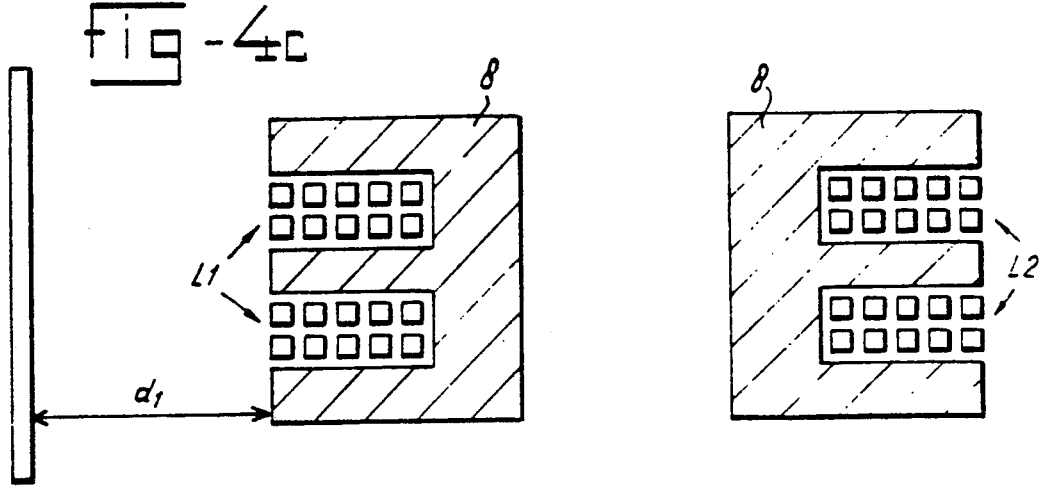

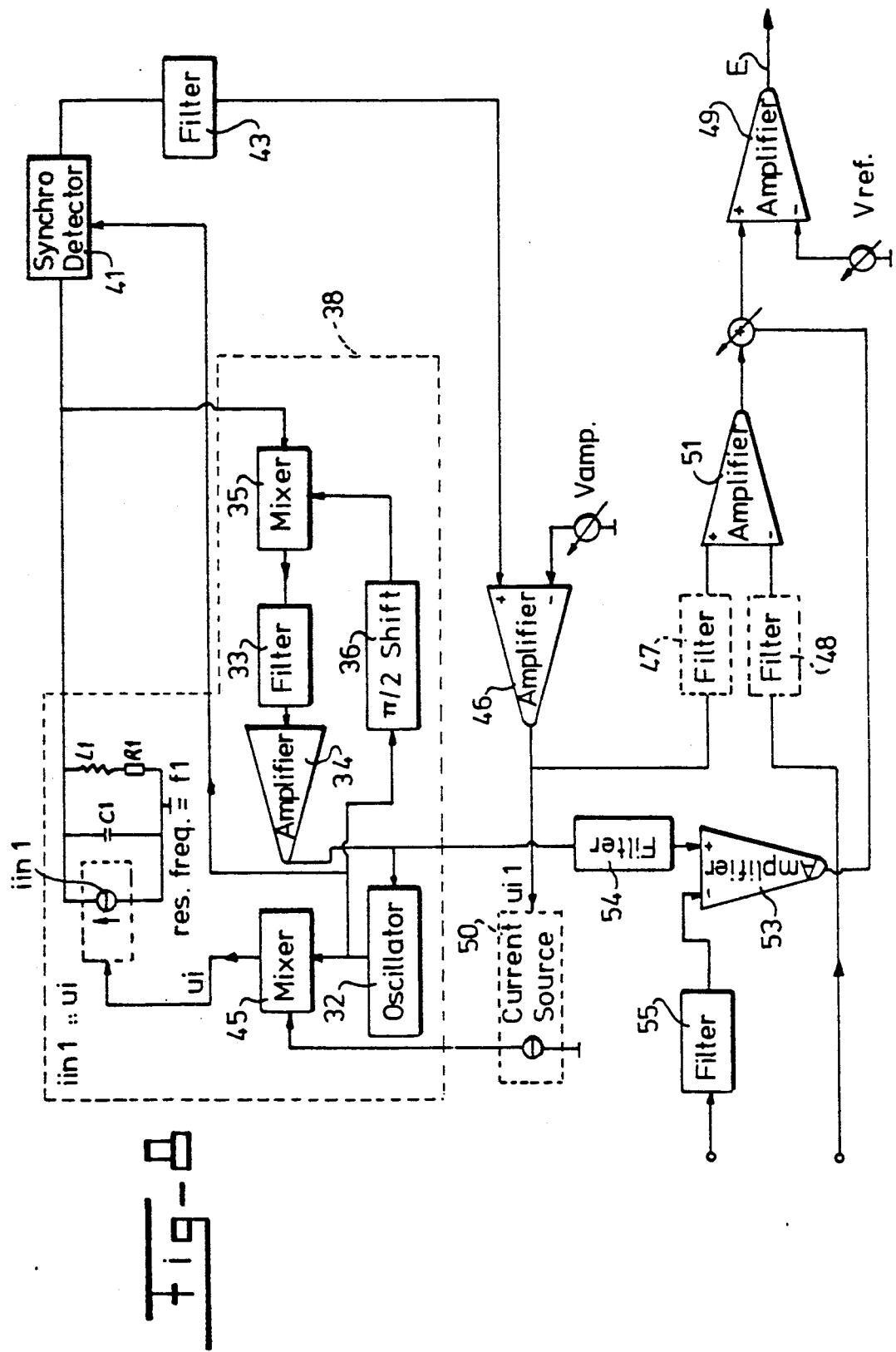

INDUCTIVE PROXIMITY SENSOR FOR DETECTING AN OBJECT STARTING ELECTRICAL CONDUCTIVITY

The invention relates to an inductive proximity sensor for detecting an object having electrical conductivity comprising a sensor housing, a measuring coil and reference coil placed on either side of a plane of symmetry through the sensor housing, each coil being partly surrounded by a piece of magnetic material which leaves the measuring coil or reference coil respectively free at the front which faces the direction of the object to be detected or a reference member, and an electronic circuit for supplying both coils with an AC signal and for measuring the change in a specific property of the measuring coil with respect to that of the reference coil when an object approaches and determining therefrom the distance or the presence of the object.

From FR-A-2.346,679 an inductive proximity sensor is known provided with a measuring coil, a block of magnetic material which surrounds the measuring coil at the side and at the rear and leaves free the front which faces the direction of a metal object to be detected, and an electronic circuit for supplying the measuring coil with an AC signal and for measuring a specific property of the coil and for determining therefrom the distance to the metal object.

With such a known inductive proximity sensor, in the presence of, or on approaching, a metal object within the field of the measuring coil, loss or eddy currents will be generated in said metal object. As a result of the finite impedance of said object, losses will be produced thereby, as a result of which the equivalent loss resistance of the measuring coil is changed. Also the self-inductance of the measuring coil changes. The said loss resistance and/or the self-inductance is measured in an electronic circuit with which the distance to the said object is determined. The loss resistance and self-inductance depend not only on this said distance, but also on the size of the coil, the magnetic (core) material, and the influence of temperature thereon.

In order to give the sensor a directional sensitivity, the block of magnetic material may be surrounded by a screening ring of conducting material, such as copper. This neutralizes the magnetic H field at the front and rear of the measuring coil. The remaining B field in the magnetic material is then completely determined by the properties of the measuring coil, the current in the measuring coil and the properties of the magnetic material.

The non-ideal properties of the magnetic material are reflected in the B field and therefore in the sensitivity of the sensor. In particular, the temperature dependence of the magnetic material has a large effect on the overall detection performance. Since the spread in the temperature coefficient of the magnetic materials is approximately equally as great as the temperature coefficient itself, the usual compensation techniques are in fact not adequate. The change in a specific property of the coil as a consequence of the effects of temperature determines the maximum detection distance, given the maximum permissible inaccuracy in the detection distance.

The drift in the loss resistance and/or the self-inductance due to change in temperature may possibly be compensated for by a NTC resistor in the sensor. But losses in the magnetic material cannot be satisfactorily compensated for with such a resistor. For accurate compensation, it would be necessary to have an individual NTC resistor for each core of magnetic material.

From DE-A-3,228,524 another inductive proximity sensor for the detection of an object having electrical conductivity is known in accordance with the preamble of claim 1. This sensor uses two separate magnetic circuits, one of which comprises the measuring coil and the other of which comprises the reference coil. Both coils are driven from an electronic circuit having a single signal source and with the aid of capacitors and by adjustment to the frequency of the signal source are brought into resonance. The phase shift of the voltage across the reference circuit with respect to that of the measuring circuit is measured and is used as a measure for the distance. The disadvantage of this sensor is the said required adjustment of at least one of the circuits and the mutual influence of the fields in both magnetic circuits. Therefore it is necessary to provide a screening between both circuits in order to prevent crosstalk and thereby to obtain a good sensitivity. In addition both magnetic circuits cannot be very well made equal to each other.

The known sensors also lack the possibility of accurately adjusting, at a particular temperature, the detection distance of the sensor, i.e. the distance between object to be detected and sensor at which an output signal is generated.

The object of the invention is to eliminate the above-mentioned problems and to provide a very accurate inductive proximity sensor which has a large and adjustable detection range and which is highly insensitive to effects of temperature and to electrical and/or magnetic interference fields.

This is achieved, according to the invention, in an inductive proximity sensor of the type mentioned in the introduction in that the pieces of magnetic material around the two coils are formed essentially from the same homogeneous material forming a block, in that means are provided in the sensor housing for screening magnetic fields produced by both coils in order to suppress thereby mutual cross-talk, and in that the electronic circuit for each coil has a separate synchronous detector with its own oscillator for effecting a frequency-selective measurement such that the effect of changes in the properties of the magnetic material and of the measuring coil on the detection distance is compensated for electronically.

Said screening means in the sensor housing may be a screening ring of conducting material around the block of homogenous magnetic material, which neutralizes the H field at the front and rear and the sensitivity of the sensor is limited to measuring side and reference side. Since the ring has a finite impedance, this will cause some damping, as a result of which the sensitivity of the sensor decreases to some extent.

In the sensor according to the invention, the block of magnetic material may be composed of one piece of homogeneous magnetic material or of two pieces of essentially identical, homogeneous magnetic material which join each other at the symmetry plane. Also said screening in the sensor housing can be realized such that the two pieces of essentially identical, homogeneous magnetic material are situated opposite each other at a distance at the symmetry plane. In this manner, two virtually identical sensors are obtained, i.e. the measuring coil and the reference coil, which share the same or essentially the same magnetic material. Both sensors therefore have the same, or virtually the same, properties in relation to the magnetic material and virtually the same properties in relation to the two coils. After all, the wire properties of the coils can be kept very satisfactorily constant. Consequently, in relation to the properties of the magnetic material in the case of one piece or of two pieces of magnetic material, a compensation is achieved for the measuring sensor with the aid of a direct or indirect measurement and, in relation to the properties of the coil, a compensation is achieved for the measuring sensor with the aid of the indirect measurement.

The specific properties of the two coils are measured independently of each other. For this purpose, each coil is driven from the electronic circuit with an oscillator signal of particular frequency. The specific property of the measuring coil is measured at the frequency f1 and that of the reference coil at the frequency f2. In order to sufficiently reduce cross-talk between both coils, this measurement has to be effected in a frequency-selective manner, for instance with the aid of a synchronous detection circuit. As a result of this drive, the two coils each generate a magnetic B field in the magnetic material (B=uH, where u is the permeability of the magnetic material). As a result of the high permeability of the magnetic material, the field lines of the B field, generated by the measuring coil, in the direct vicinity of said coil pass through the magnetic material, which B field virtually is not enclosed by the reference coil. Conversely, it is also the case that the B field generated by the reference coil virtually is not enclosed by the measuring coil. Furthermore, the copper screening ring, if present, ensures that the H field generated by the first coil or by the second coil is virtually enclosed by the second coil or the first coil. In this manner, a sufficiently effective screening of the fields of the two coils is achieved, even though they are situated in each other's vicinity.

The distance between an object, which has to be detected and which has electrical conductivity, and the sensor, i.e. the measuring coil, now has to be measured. Situated opposite the reference coil is a reference member, for instance a metal plate, at a known fixed distance. If, in this embodiment, the electronic circuit delivers an output signal, if the loss resistance, the self-inductance, or a combination of both quantities, of the measuring coil is greater than or equal to the comparable quantity of the reference coil, the detection distance is equal to the reference distance. With the object, for instance of metal, at a greater distance, the difference in measured specific quantity $\Delta Sp$ of the two coils is a measure of the difference in distance from metal object to the sensor and reference plate to the sensor. By now causing the electronic circuit to deliver an output signal if $\Delta Sp$ is greater than a particular adjustable value, the detection distance can consequently be adjusted. A particular detection distance can also be adjusted without the reference metal plate.

In one embodiment, the screening ring extends only over a part of the circumference around the block of magnetic material. This extension of only small dimension is adequate to sufficiently reduce the cross-talk of the H fields generated by the two coils. However, as a result of the small extension of the ring and the low damping effect of the ring on the coils resulting therefrom, the differential sensitivity of the sensor, i.e. the change in the specific quantity of the coil divided by the displacement of the metal object, is greater if the screening ring extends over the entire circumference. As a result of this, a metal object can be detected at a greater distance.

In another embodiment, the screening ring may extend over the entire circumference around the block of magnetic material. This embodiment forms the so-called "fully shielded" mountable sensor, which can be mounted in a metal object, for example a robot arm and the like. The screening ring may also project on the reference coil side beyond the circumference and in doing so assume the function of the reference plate at a particular distance opposite the reference coil. Here too, the loss resistance and the self-inductance of the reference coil is not, or is virtually not, dependent on the presence of metal objects which are situated behind the projecting screening ring. The screening ring may also be closed off on the reference coil side by a metal or copper plate.

The electronic circuit in the above embodiment, which makes use of a separate synchronous detector with its own oscillator for the measurement coil and for the reference coil in order to effect a frequency-selective measurement, may be used with advantage to suppress ambient interference, for example 50 Hz interference signals.

In a further embodiment, the two oscillators may have a frequency offset in order to reduce the effect of crosstalk between the individual drive signals of the two coils.

The invention will be explained in more detail on the basis of some exemplary embodiments with reference to the drawings, in which:

FIGS. 1a and 1b show embodiments of a known inductive proximity sensor, and

FIG. 2 shows the principle of the inductive proximity sensor according to the invention;

FIGS. 3a, 3b and 3c show embodiments of the "fully shielded" mountable type of the sensor according to the invention;

FIGS. 4a, 4b and 4c show embodiments of the "unshielded" mountable type of the sensor according to the invention;

FIG. 8 shows the circuit diagram of the electronic circuit with the coils driven by an external oscillator, and with synchronous amplitude detector.

In the known inductive proximity sensor shown in FIGS. 1a and 1b, L1 indicates the measuring coil, 8 indicates the block of magnetic material and 3 indicates the approaching metal object to be detected, for example a metal plate. The sensor in FIG. 1a is of the so-called "unshielded" type which has to be mounted in a manner such that there is no metal present in the direct vicinity of said sensor apart from the approaching metal object. FIG. 1b shows the known sensor of the so-called "fully shielded" type which can be mounted in a metal holder, for example a robot arm and the like. Said sensor has a screening ring 4, for example of copper, around the block of magnetic material to screen the magnetic field. A metal platelet may possibly also be disposed at the rear of the block of magnetic material.

As a result of this construction, the equivalent loss resistance and the self-inductance of the measuring coil depends only on the presence or approach of a metallic object at the front of the sensor.

Figure 1C:
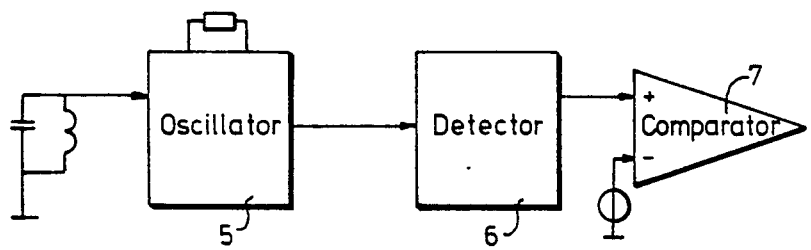
FIG. 1c shows an electronic circuit associated thereto.

The electronic circuit shown in FIG. 1c of the known sensor comprises an oscillator 5, for example a negative-impedance oscillator, a detector 6 and a comparator 7. The value of the negative impedance is determined by the external resistor shown at the oscillator. Connected to said oscillator is a LC circuit formed by the sensor measuring coil. If the equivalent (loss) parallel resistance of the LC circuit exceeds a particular value as a result of the approach of a metal object, the oscillator stops. This stopping of the oscillator is used to give a useful signal. This relatively simple principle is adequate only as long as no high accuracies are required. As explained earlier, the inaccuracies in the detection distance as a result of the drift in the resistance of the coil wire and in the magnetic material due to change in temperature are, moreover, a large problem. The temperature coefficient, for example of the losses in the magnetic material has a spread which is just as large as the temperature coefficient itself.

FIG. 2 shows the general principle of the sensor according to the invention. L2 indicates a reference coil, 9 indicates a metal reference plate, and 10 indicates the transverse plane of symmetry of the sensor. In this basic diagram, the magnetic material is shown as composed of one piece. The specific properties of the measuring and reference coils L1, L2 are measured independently of each other by separate parts of the electronic circuit. For this purpose, the measuring coil is driven with a signal having frequency f1 and the reference coil with a signal having frequency f2, as a result of which these coils each generate a magnetic B field in the magnetic material. As a result of the permeability of the magnetic material, the B field generated by the measuring coil virtually will not be enclosed by the reference coil and conversely. The screening ring 4 shown ensures that the H field generated by the measuring coil is virtually not enclosed by the reference coil and conversely. This construction achieves an effective screening between the two coils even though they are close to each other.

In the electronic circuit, if a metal object, such as the metal plate 3, approaches or is present, the difference is measured between the specific property of the measuring coil L1 and the corresponding property of the reference coil L2. Because the sensor is of mirror-symmetrical construction and the coils L1 and L2 are identical, and the magnetic material is homogeneous, if both coils are driven with identical signals (same frequency and same amplitude), the equivalent loss resistance and the self-inductance of the measuring coil will be equal to that of the reference coil if the test plate 3 is at a distance d1 which is equal to the distance d2 of the reference measurement plate 9. As a result of this an accurate distance detection is possible independently of the temperature. If at the same time the block of magnetic material is composed of one piece or two pieces of homogeneous material, the properties of said material are determined with the aid of the reference coil via a so-called direct or indirect measurement. If the measuring coil and the reference coil are as identical as possible, the properties of the measuring coil are determined via a so-called indirect measurement.

The sensors of the so-called "fully shielded" mountable type shown in FIGS. 3a to 3c are each provided with a screening ring 4. Said screening ring projects a small amount on the reference coil side and thereby assumes the function of the reference plate 9. Here too, the equivalent loss resistance and the self-inductance of the reference coil L2 is not, or is virtually not, dependent on the presence of metal objects which may be situated behind the projecting screening ring. The end of the projecting screening ring may in turn also be closed off with a metal or copper plate. By again comparing the difference in the specific quantity of the measuring coil and the corresponding quantity of the reference coil in the electronic circuit with an adjustable value, the detection distance of the sensor can be adjusted. The effect of temperature thereon is again minimal.

In FIG. 3a, the block 8 is composed of magnetic material made from one piece of homogeneous material, as a result of which the properties of said material are again measured directly by means of the coil. In FIG. 3b, the block 8 is composed of two pieces of essentially identical homogeneous magnetic material, as a result of which the properties of the magnetic material which is situated around the measuring coil L1 are indirectly measured by determining the properties of the magnetic material which is situated around the reference coil L2.

In the embodiment shown in FIG. 3c, the block 8 is composed of magnetic material again made from two pieces of essentially identical homogeneous material which are spaced from each other on either side of the plane of symmetry. The properties of the magnetic material around the measuring coil are again determined by an indirect measurement. Drift in the resistance and the self-inductance of both coils and the associated coil material due to temperature variation affects the detection distance. Because the risk of a larger temperature difference between the two coils and cores of magnetic materials exists in this embodiment, this embodiment is somewhat more inaccurate than that of FIGS. 3a and 3b.

The sensors shown in FIGS. 4a to 4c of the so-called "unshielded" mountable type have a screening ring which only extend over a small distance around the circumference of the block of magnetic material. The object of this ring is again to sufficiently suppress the cross-talk of the H fields generated by the two coils. As a result of the small extension of this screening ring, the differential sensitivity of the sensor is somewhat greater than that of the "fully shielded" mountable type, as a result of which a greater detection distance is achieved.

In the embodiment, as indicated in FIGS. 3c and 4c, a screening plate can be positioned between both pieces of magnetic material for the screening function instead of or in combination with the screening ring.

In the embodiments shown above, a metal reference plate may be present at the rear of the sensor. The sensor is then no longer sensitive to metal objects which are situated behind said reference plate so that, for example, the electronic circuit may be accommodated in that position.

As stated earlier, the corresponding specific quantities of the two coils have to be measured at a particular frequency. If no coupling at all is present between the two coils, as, for example in the case of FIGS. 3c and 4c, the measurement of the specific quantity can be carried out by driving with two identical signals, i.e. identical frequency and amplitude.

Figure 5:
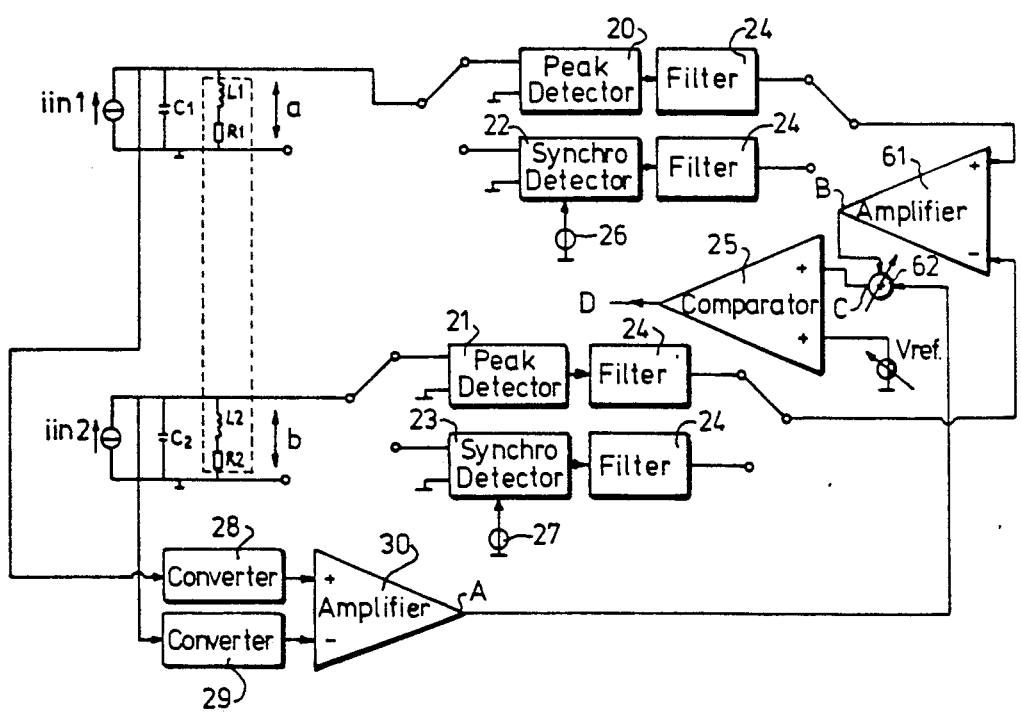
FIG. 5 shows a basic circuit diagram of the sensor with electronic circuit according to the invention.

For this measurement, a capacitor is disposed parallel to the measuring coil and also parallel to the reference coil, as shown in FIG. 5. The circuit containing the measuring coil L1 has a resonance frequency f1 and the circuit containing the reference coil L2 has a resonance frequency f2. The measuring circuit is driven with a signal iin1 having frequency fos1 and the reference circuit is driven with a signal iin2 having frequency fos2. In the ideal case, fos1=f1 and fos2=f2. The amplitude across the measuring circuit is a measure of the ratio between the self-inductance L1 and the equivalent loss resistance R1 of the measuring coil, and the same applies to the ratio L2/R2 of the reference coil L2. At the same time the resonance frequencies f1 and f2 are a measure for the self-inductance of measuring coil and reference coil. The amplitude or envelope of the circuit voltage a or b can be detected with the aid of a peak detector 20, 21 or a synchronous detector 22, 23. The low-pass filter 24 incorporated after the detector determines the bandwidth of the detection and said filter suppresses any interference signals which are present at the output of the detector and are outside the passband.

The frequencies fos1 and fos2 of both signals, which drive the two tuned circuits, are determined with the aid of the frequency-voltage converters 28, 29. The difference in the output direct voltage of both converters is a measure for the difference in the values of the self-inductances of both coils. This difference signal is available after the differential amplifier 30 (voltage from A). The difference in direct voltage after the low-pass filters 24 is available after the differential amplifier 61 (voltage from B) and is a measure for the difference in the ratio L/R of both coils. The voltages at A and at B are added to each other in a certain ratio with the aid of adder 62. The output voltage of this adder is then compared with an adjustable voltage Vref in the comparator 25 which provides an output voltage at D. The detection distance can be set by means of this adjustable value. Connected to each of the synchronous detectors 22, 23 is a local oscillator 26, 27 associated with the synchronous detection.

In virtually all embodiments of the sensor, a small parasitic coupling will occur between the coils and this results in parasitic crosstalk between the signals in the two circuits. Thus, an interference current source having frequency fos2 will appear in the measuring circuit and this will deliver an interference voltage having frequency fos2 across the circuit in addition to the desired signal having frequency fos1. This applies also to the interference signal across the reference circuit.

If a peak detector is used, the amplitude of the desired signal is transformed into a direct voltage Ug and the amplitude of the interference signal is also converted into a direct voltage Us1 so that the sum of the two direct voltages Ug+Us1 is produced at the output. In addition to this direct voltage, an interference signal having a frequency (fos1-fos2) is present. The interference direct voltage Us1 due to parasitic coupling always appears regardless of whether the frequencies fos1 and fos2 are or are not equal to each other. The detected interference signal Us1 due to parasitic coupling is reduced only by the filtering action of the resonance measuring circuit itself. If fos1 is approximately equal to f1 and fos2 is approximately equal to f2, the frequency difference between the two oscillator signals must be greater than half the bandwidth of the resonance measuring circuit to make use of this filtering action.

If a synchronous detector is used, the amplitude of the desired signal having frequency fos1 is converted into a direct voltage Ug which is a measure of the amplitude of said desired signal. The interference signal Us2 having frequency fos2 is converted into an interference signal Us having frequency (fos1-fos2). This signal can be suppressed by the filter after the detector. For this purpose, the frequency difference between the two drive signals must be greater than the bandwidth of said filter, that is to say, the detection bandwidth. Said interference signal is also, of course, filtered by the resonance measuring circuit just as in the case of the peak detector. In order to make use of this filtering action again, the frequency difference between the two oscillators must be greater than half the bandwidth of the resonance measuring circuit.

In the case where the oscillator frequencies and the resonance frequencies of the circuits are precisely equal, viz. fos1=f1=fos2=f2, both detectors deliver an interference direct voltage Us due to parasitic coupling in addition to the direct voltage Ug. The peak detector following the measuring circuit now measures a voltage Uga+Usa and the detector connected to the reference circuit measures a voltage Ugb+Usb. The detection distance of a sensor without the frequency-voltage converters 28, 29 and the amplifier 30 can then be adjusted independently of the temperature if the following is valid:

$$Usa - Usb = K1(Uga - Ugb) + K2, \quad (1)$$

where K1 and K2 are constants. K1 must also be less than one and this is satisfied for a small coupling factor between the circuits.

In practice it is advantageous to suppress the interference by filtering by means of a frequency offset between the two oscillator signals. As a result of this, however, a small error is produced in the sensor system which may, however, be kept low by choosing the frequency-offset not greater than necessary for a good filtering action.

In the electronic circuit, a quantity derived from the equivalent series resistance of the coil is measured since said resistance is in series with the self-inductance of the coil. The equivalent parallel resistance of the resonance circuit in which the measuring coil is situated is therefore measured. This parallel resistance is given by:

$$Rp = (1/(4\pi^2)) \cdot (L/C)(1/Rs), \quad (2)$$

where Rp=equivalent parallel resistance of the circuit,
Rs=equivalent series resistance of the coil
L=self-inducance of the coil
C=parallel capacitance across the coil.

A small change in the resonance frequency due to a small variation in the parallel capacitance of the circuit has a negligible effect on the self-inductance and on the equivalent series resistance of the coil. It is assumed that both coils and their losses are precisely equal to each other. By making the capacitance over the two coils differ slightly from each other, a small difference is introduced in the resonance frequencies of the two circuits. As a result of this, the ratio, viz "gain", between the resistance Rs and the parallel resistance Rp for both resonance circuits is different. This can be compensated for in a simple manner by means of a difference in gain in the two detectors. This achieves the result that equal changes in L and Rs of the two sensor coils as a result of temperature changes have no effect on the detection distance.

The remaining error in the system as a result of the fact that the properties of the magnetic material of the coils are measured at two different frequencies can be kept very low by choosing the frequency offset no greater than is absolutely necessary, as stated.

If the frequency of the driving signal is not precisely equal to the resonance frequency of the driven circuit, this will produce a direct voltage Us3 which is subtracted from the voltage which appears at circuit resonance. If the equation (1), in which Us3 must also be included in the voltage Us, is then again met, Us3 has no effect on the operation of the sensor.

Summarizing, it may be stated that, if parasitic coupling is present between the two sensor coils, it is advantageous in the case of synchronous detection to provide a frequency offset between the driving signals of the two circuits in order to filter out the interference signal.

The above is applicable to unshielded mountable sensors. In the case of fully shielded mountable sensors, such as shown in FIG. 3, the projecting ring will result in a detuning of the reference circuit. Said detuning can, if necessary, be supplemented by providing a capacitor across the circuit in order to achieve the desired frequency offset.

The drive signals can be generated both with external oscillators, in which case the sensor coils do not form part of the oscillator circuits, and with internal oscillators, in which case the sensor coils do form part of the oscillator circuits.

Figure 6:
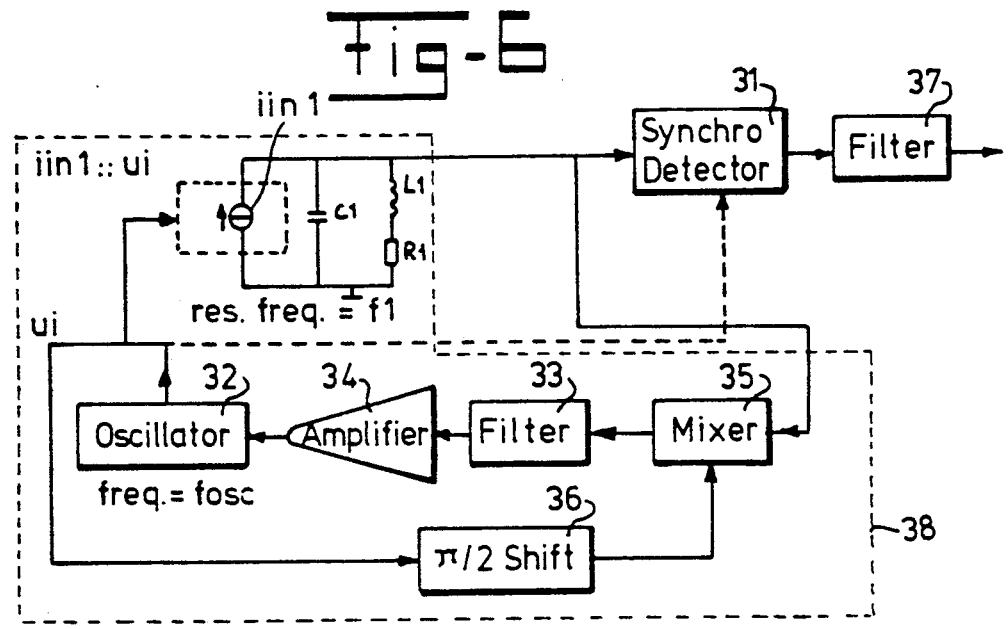
FIG. 6 shows the circuit diagram of the electronic circuit with the coils driven by an external oscillator.

FIG. 6 shows an embodiment for the external oscillators' case. The oscillator signal iin1 to be used to drive the coil L1 must have a frequency equal to the resonance frequency of the circuit. For this purpose, an oscillator control loop 38 or a separate oscillator comprising the coil L1 in its circuit may be used. FIG. 6 shows an example of such an oscillator control loop in which a phase-locked loop 38 comprising an oscillator 32, a 90° phase shifter 36, a mixer 35, a loop filter 33, and an amplifier 34, which loop ensures that the voltage across the resonance circuit and the current to the resonance circuit are in phase. The oscillator signal from the oscillator 32 may also be used as a local oscillator signal for the synchronous detector 31. The same construction is applicable for driving the resonance circuit containing the reference coil L2.

If parasitic coupling is present between the two sensor coils, the drive signal for the reference coil L2 will have a crosstalk effect on the measuring coil L1 and an interference signal having frequency fos2 will be produced as a current source parallel to the resonance circuit containing coil L1. If the interference current falls within the passband of the circuit, no damping of the interference signal occurs. The interference voltage across the circuit then leads to an interference signal having frequency (fos1-fos2) in the control loop. The effect of said interference signal on the oscillator signal is determined by the filtering action of the control loop. If the interference component falls outside the passband of the control circuit, the effect thereof is reduced.

Since it will almost always be the case that fos1 is approximately equal to f1 and fos2 is approximately equal to f2, it is possible to benefit from the filtering action of the two filters by making the frequency difference between the two oscillators so large that (fos1-fos2) is greater than half the bandwidth of the resonance circuit and is also greater than the loop bandwidth of the oscillator control loop.

The interference signal in the oscillator control loop has the result that the oscillator frequency fos1 is no longer equal to the resonance frequency f1 and, to some extent, moves in the direction of fos2. The oscillator signal which has the new frequency $fos1 = f1 + \Delta f1$ is furthermore frequency modulated with the interference signal having frequency (fos1-fos2).

If a metal plate approaches, not only will the equivalent loss resistance of the measuring coil change, but also, to a small extent, the self-inductance of the coil. As a result of this, the resonance frequency of the circuit undergoes a slight change. The oscillator control loop must therefore have a sufficiently large loop bandwidth, preferably greater than the detection bandwidth, in order to accommodate this.

The drive signal of the oscillator 32 from the amplifier 34 is a measure for the detuning of the resonance circuit having the measuring coil L1 and therefore is a measure for the self-inductance of this coil. The self-inductance of the coil L1, in this way, is measured in a frequency-selective manner through which the oscillator control loop fulfils the function of a synchronous detector. Therefore a frequency-voltage converter is realized in this manner.

Figure 7:
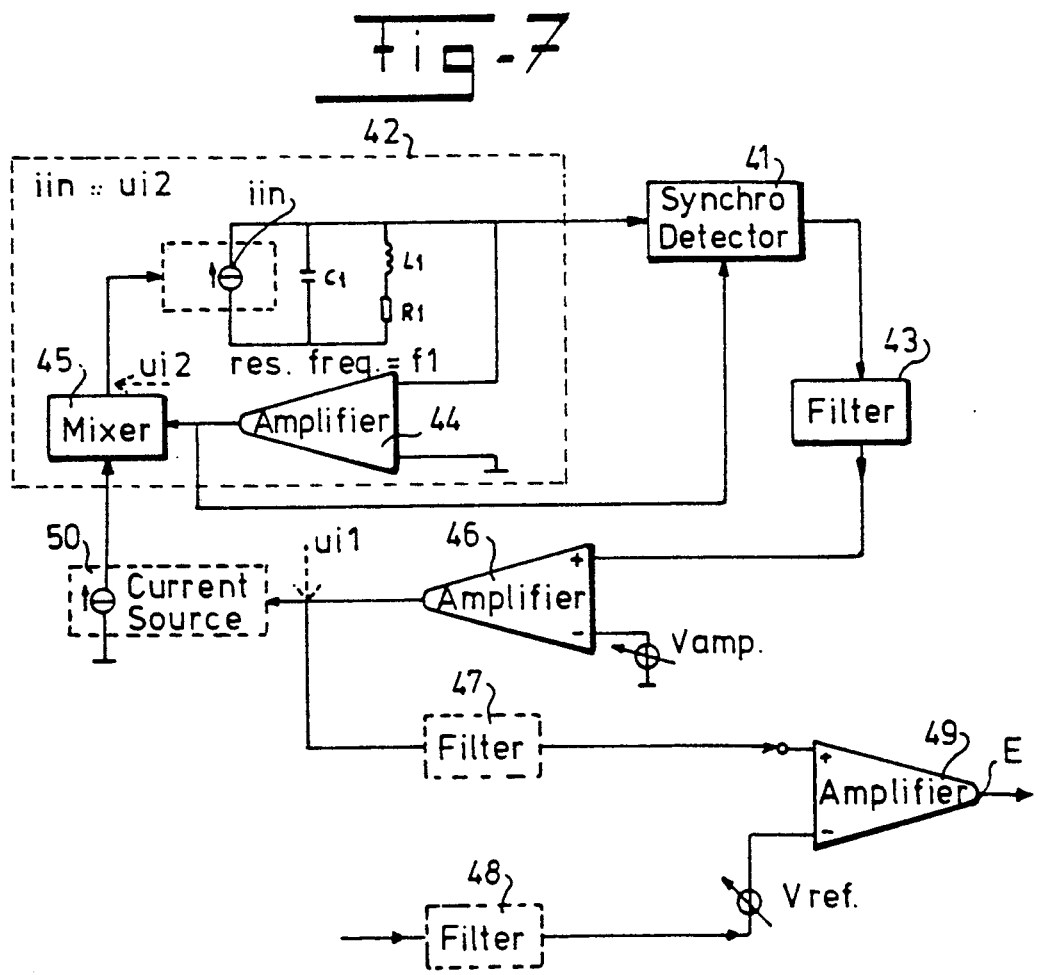
FIG. 7 shows the circuit diagram of the electronic circuit with the coils driven by an internal oscillator.

FIG. 7 shows an embodiment for the case involving driving with an internal oscillator. In this case, the resonance circuit is incorporated directly in the oscillator circuit, as a result of which a control loop is no longer necessary, as is the case with external oscillator drive. The parasitic coupling between the two sensor coils again causes crosstalk and all the parasitic effects as explained in the case of driving with external oscillators also occur here. In this case, however, the filtering in the oscillator control loop is absent, as a result of which the effect of the crosstalk is greater in this case. Thus, if the oscillator frequencies are chosen too close to each other, injection locking may occur, as a result of which the frequencies of both oscillators become equal to each other. As a result of this, the sensor becomes unusable since the constant K1 in the equation (1) has become almost one. It has also become impossible to measure the difference in the values of the self-inductances of the coils L1 and L2. That is to say, as a result of the approach of a metal object on the measuring coil side, the output voltages of the two detectors change to an equal extent. The difference voltage between the two detectors does not undergo any change, as a result of which detection of the metal object is impossible.

In the above, the ratio L/R was measured by measuring the amplitude of the circuit voltage at resonance, the amplitude of the drive signal iin of the circuit being kept constant (see FIG. 6). It is also possible to adjust the current iin with a control loop in a manner such that the amplitude of the circuit voltage remains constant at resonance when the value of the equivalent loss resistance varies. The quantity which adjusts the amplitude of iin is then a measure of the ratio L/R.

A possible embodiment for this purpose is shown in FIG. 7. The so-called internal oscillator 42, in which the resonance circuit forms part of the oscillator circuit, is used to generate the drive signal for the coil and comprises amplifier 44 and mixer 45. The amplitude of said drive signal is adjusted by the adjustable current source 50. This current source is adjusted by a loop which comprises synchronous detector 41, loop filter 43, amplifier 46 having an adjustable voltage source at the input, and adjustable current source 50, in a manner such that the voltage from the detector is kept constant at the voltage Vamp, which determines the amplitude across the circuit. The drive voltage which adjusts the current source 50 is then a measure of the ratio L/R. A similar circuit in which the reference coil L2 is incorporated is of course present. The drive voltages of the two circuits are fed to the difference amplifier 49 via the filter 47 and 48 respectively, and are again compared with the adjustable voltage source Vref in order to adjust the detection distance.

A possible embodiment, in which also the self-inductances of the coils are measured with the aid of a frequency-selective measurement, is indicated in FIG. 8.

The so-called external oscillator 38 whereby the resonance circuit does not form part of the oscillator circuit, is used for generating the drive signal for the coil and comprises a phase-locked loop such as indicated in FIG. 6, a mixer 45 being added. The amplitude across the circuit is determined with the aid of synchronous detector 41, loop filter 43, and amplifier 46 such as indicated in FIG. 7. A similar circuit is provided in which the reference coil L2 is accomodated. The drive voltages for the current sources 50 of both circuits are supplied via the filters 47 and 48 respectively to the differential amplifier 51. The output signal of this amplifier then is a measure for the difference in the ratio L/R of both coils. The drive signals of both oscillators 32 are applied via the filters 54, 55 to the differential amplifier 53. The output signal of this amplifier is a measure for the difference in the values of the self-inductances of both coils. Both output signals can be added in any ratio to each other in the adder 52. The signal then is applied to the comparator 49. The adjustment of the detection distance then is possible with the aid of the adjustable voltage source Vref.

We claim:

1. Inductive proximity sensor for detecting an object having electrical conductivity comprising
   a measuring coil having a front end facing the direction of the object to be detected,
   a reference member,
   a reference coil having a front end facing said reference member, said measuring and reference coils being placed on either side of a plane of symmetry and having their respective front ends facing in opposite directions,
   a block formed from homogeneous magnetic material which partially surrounds both said coils leaving their respective front ends free,
   an electronic circuit for supplying both said coils with an AC signal, measuring the change in loss resistance and/or self inductance of the measuring coil with respect to that of the reference coil as said object to be detected approaches and determining therefrom the distance or the presence of the object,
   means for suppress mutual crosstalk between the two said coils, and
   a separate respective detector circuit for each of said coils coupled together so as to electronically compensate for the effect of changes in properties of the magnetic material and of the measuring coil on the detection distance, wherein each said separate detector is a synchronous detector having its own oscillator.

2. Inductive proximity sensor according to claim 1, wherein both oscillators of the synchronous detectors have a frequency offset from each other.

3. Inductive proximity sensor according to claim 1, wherein the block of homogeneous magnetic material is composed of two sub-blocks of essentially identical, homogeneous magnetic material, which sub-blocks adjoin each other at the plane of symmetry and of which the one sub-block encloses the measuring coil and the other sub-block the reference coil.

4. Inductive proximity sensor according to claim 1, wherein said screening means comprises a screening ring of conducting material disposed around the block of magnetic material.

5. Inductive proximity sensor according to claim 4, wherein the screening ring extends over a part of the circumference around the block of magnetic material.

6. Inductive proximity sensor according to claim 4 wherein the screening ring extends over the width of the circumference around the block of magnetic material.

7. Inductive proximity sensor according to claim 4, wherein said reference member comprises an extension of the screening ring projecting from the front of the reference coil, as a result of which the function of the reference number is obtained.

* * * * *

UNITED STATES PATENT AND TRADEMARK OFFICE
CERTIFICATE OF CORRECTION

PATENT NO. : 5,065,093

DATED : November 12, 1991

INVENTOR(S) : Hendrikus C. Nauta; Ernst H. Nordholt

It is certified that error appears in the above-identified patent and that said Letters Patent is hereby corrected as shown below:

On the title page: Item [54] and Column 1, line 1

In the title, change "STARTING" to -- HAVING --.

[56] References Cited, FOREIGN PATENT DOCUMENTS, change "322852" to -- 3228524 --.

OTHER PUBLICATIONS, add the following document:

-- Patent Abstracts of Japan (Vol. 9, No. 199) --.

ABSTRACT, line 12, after "when" insert -- an --.

Column 1, line 3, in the title, change "STARTING" to -- HAVING --.

Column 2, line 50, change "homogenous" to -- homogeneous --.

Column 3, line 23, change "(B=uH, where u" to -- (B=$\mu$H, where $\mu$ --.

Column 3, line 33, change "virtually enclosed" to -- virtually not enclosed --.

UNITED STATES PATENT AND TRADEMARK OFFICE
CERTIFICATE OF CORRECTION

PATENT NO. : 5,065,093

DATED : November 12, 1991

INVENTOR(S) : Hendrikus C. Nauta; Ernst H. Nordholt

It is certified that error appears in the above-identified patent and that said Letters Patent is hereby corrected as shown below:

Column 8, line 51, change "self-inducance" to -- self-inductance --.

Signed and Sealed this

Twenty-eighth Day of December, 1993

Attest:

BRUCE LEHMAN

Attesting Officer

Commissioner of Patents and Trademarks